Figure 1:
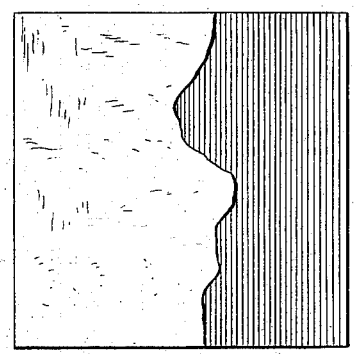

(No Model.)

P. C. MÖLLER.
METHOD OF MAKING LITHOGRAPHIC PRINTING PLATES.

No. 295,661. Patented Mar. 25, 1884.

WITNESSES:

INVENTOR
Peter Corfitz Möller
BY Goepelt Raegener
ATTORNEYS.

UNITED STATES PATENT OFFICE.

PETER CORFITZ MÖLLER, OF LEIPSIC, SAXONY, GERMANY.

METHOD OF MAKING LITHOGRAPHIC PRINTING-PLATES.

SPECIFICATION forming part of Letters Patent No. 295,661, dated March 25, 1884.

Application filed May 26, 1883. (No model.) Patented in Germany February 10, 1883, No. 23,302; in France March 19, 1883, No. 154,373; in Hungary April 10, 1883, No. 22,459; in Belgium April 14, 1883, No. 61,090; in Austria May 20, 1883, No. 14,129, and in Italy June 30, 1883, XVII, No. 15,586, XXXI, 77.

*To all whom it may concern:*

Be it known that I, PETER CORFITZ MÖLLER, of Leipsic, Saxony, in the Empire of Germany, have invented certain new and useful Improvements in the Method of Preparing Lithographic Printing-Plates, (which has been patented to me heretofore by the government of Germany by Letters Patent No. 23,302, dated February 10, 1883; in France, No. 154,373, March 19, 1883; in Hungary, No. 22,459, April 10, 1883; in Belgium, No. 61,090, April 14, 1883; in Austria, No. 14,129, May 20, 1883, and in Italy, Vol. 17, No. 15,586, June 30, 1883,) of which the following is a specification.

This invention has reference to an improved method of making lithographic printing-plates; and the invention consists of a method of preparing lithographic printing-plates by moistening the surface of the metal foundation-plate with a saturated solution of bicarbonate of lime, then heating said plate so as to evaporate said solution, and repeating these steps until a coating or deposit of bicarbonate of lime is obtained on the plate, so that the same can be used in the same manner as a lithographic stone.

In carrying out my invention a saturated solution of bicarbonate of lime is first prepared, which is obtained by dissolving hydrate of lime in water and then introducing carbonic acid into the solution until the same has an acid reaction. In this manner a saturated solution of bicarbonate of lime is obtained, which forms a clear liquid, that is then drawn from the remaining undissolved hydrate of lime. A carefully-cleaned foundation-plate of metal is next moistened on its surface with this solution, preferably by applying the solution in the form of a spray by means of an atomizer. The metal plate is next slowly heated, but only to such a temperature that the formation of spheroidal drops thereon is avoided. By the heat the water of the solution is evaporated and the lime contained in the same deposited on the surface of the plate. The moistening of the metal surface and the evaporation of the solution are continued at proper intervals until a firmly-adhering deposit of lime is obtained on the plate, which deposit possesses all the properties of the lithographic stone, and which can be used as a substitute for the lithographic stones heretofore employed, either for transfer-work or for direct work or by engraving thereon.

The prints are made in the same manner as in lithographic printing, prints of a high degree of perfection being obtained from the plate.

Figure 2:
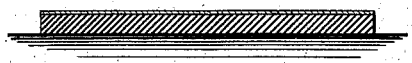

In the accompanying drawings, Figure 1 is a plan view of the completed plate with a portion of the deposited lime broken away, and Fig. 2 is a section through the completed plate.

Having thus described my invention, I claim as new and desire to secure by Letters Patent—

The method herein described of preparing lithographic printing-plates, which consists in moistening the surface of a metal foundation-plate with a saturated solution of bicarbonate of lime, then heating said plate so as to evaporate the solution, and repeating these steps until a coating or deposit of bicarbonate of lime of sufficient thickness is formed on the plate, which is then used in the same manner as a lithographic stone, substantially as set forth.

In testimony that I claim the foregoing as my invention I have signed my name in presence of two subscribing witnesses.

PETER CORFITZ MÖLLER.

Witnesses:
GUSTAV GOTHDART,
FREDK. W. KOHLER.